(12) United States Patent
Smolle et al.

(10) Patent No.: US 12,502,551 B2
(45) Date of Patent: Dec. 23, 2025

(54) IRRADIATION DEVICE AND SYSTEM FOR PHOTODYNAMIC DISINFECTION OF TEETH AND GUMS

(71) Applicant: MANA HEALTH TECHNOLOGIES GMBH, Graz (AT)

(72) Inventors: Johannes Smolle, Graz (AT); Elisa Böhm, Graz (AT)

(73) Assignee: MANA HEALTH TECHNOLOGIES GMBH, Graz (AT)

( * ) Notice: Subject to any disclaimer, the term of this patent is extended or adjusted under 35 U.S.C. 154(b) by 378 days.

(21) Appl. No.: 18/029,253

(22) PCT Filed: Oct. 13, 2020

(86) PCT No.: PCT/AT2020/060366
§ 371 (c)(1),
(2) Date: Mar. 29, 2023

(87) PCT Pub. No.: WO2022/077037
PCT Pub. Date: Apr. 21, 2022

(65) Prior Publication Data
US 2023/0364443 A1    Nov. 16, 2023

(51) Int. Cl.
*A61N 5/06*    (2006.01)

(52) U.S. Cl.
CPC ......... *A61N 5/0624* (2013.01); *A61N 5/0603* (2013.01); *A61N 5/062* (2013.01);
(Continued)

(58) Field of Classification Search
CPC .... A61N 5/0624; A61N 5/0603; A61N 5/062; A61N 2005/0606; A61N 2005/0645;
(Continued)

(56) References Cited

U.S. PATENT DOCUMENTS

| | | | |
|---|---|---|---|
| 7,210,814 B2 * | 5/2007 | Scott | A61C 19/004 433/29 |
| 9,140,708 B2 * | 9/2015 | Zaidel | G01N 33/6893 |

(Continued)

FOREIGN PATENT DOCUMENTS

| | | |
|---|---|---|
| WO | 2011084744 A1 | 7/2011 |
| WO | 2021069805 A1 | 4/2021 |

OTHER PUBLICATIONS

International Preliminary Report on Patentability dated Apr. 13, 2023, in corresponding International Application No. PCT/AT2020/060366.

(Continued)

*Primary Examiner* — Jonathan T Kuo
(74) *Attorney, Agent, or Firm* — Hoffmann & Baron, LLP

(57) ABSTRACT

An irradiation device for photodynamic disinfection of teeth and gums in a mouth, comprises a mouthpiece which can be inserted into the mouth. The mouth piece has a U-shape approximating the dental arch and is equipped with one or more radiation sources for radiation in a wavelength range between 500 nm and 1000 nm. The irradiation device further comprises a handle piece which projects from the mouthpiece in such a way that it protrudes from the mouth after insertion of the mouthpiece, and a controller for actuating the radiation sources. The handle piece comprises a heat sink and the one or more radiation sources are mounted on a heat-conducting substrate which connects the radiation sources to the heat sink in a heat-conducting manner. Further described is a system comprising such an irradiation device and a rinsing solution.

20 Claims, 2 Drawing Sheets

(52) U.S. Cl.
CPC ................ *A61N 2005/0606* (2013.01); *A61N 2005/0645* (2013.01); *A61N 2005/0651* (2013.01); *A61N 2005/0659* (2013.01)

(58) Field of Classification Search
CPC .... A61N 2005/0651; A61N 2005/0659; A61N 2005/0652; A61N 2005/0662; A61C 19/06
See application file for complete search history.

(56) References Cited

U.S. PATENT DOCUMENTS

| | | | | |
|---|---|---|---|---|
| 11,147,984 | B2* | 10/2021 | Emerson | A61N 5/0624 |
| 11,737,955 | B2* | 8/2023 | Kishen | A61K 6/62 |
| | | | | 424/489 |
| 11,950,569 | B2* | 4/2024 | Soerensen | A61K 38/54 |
| 2006/0245187 | A1* | 11/2006 | Scott | A61C 19/004 |
| | | | | 362/804 |
| 2008/0032252 | A1 | 2/2008 | Hayman et al. | |
| 2008/0254405 | A1* | 10/2008 | Montgomery | A61C 19/06 |
| | | | | 433/29 |
| 2008/0255498 | A1 | 10/2008 | Houle | |
| 2013/0280671 | A1* | 10/2013 | Brawn | A61N 5/0613 |
| | | | | 433/29 |
| 2014/0272770 | A1* | 9/2014 | Hurley | A61N 5/0603 |
| | | | | 433/29 |
| 2014/0348762 | A1* | 11/2014 | Zaidel | G01N 33/6893 |
| | | | | 530/389.3 |
| 2015/0044628 | A1 | 2/2015 | Flyash | |
| 2015/0086631 | A1* | 3/2015 | Kishen | A61K 41/0057 |
| | | | | 514/777 |
| 2016/0051833 | A1 | 2/2016 | Patel et al. | |
| 2018/0256916 | A1* | 9/2018 | Kothari | A61N 5/0624 |
| 2019/0175956 | A1* | 6/2019 | Dolezal | A61K 8/99 |
| 2021/0137075 | A1* | 5/2021 | Soerensen | A61K 38/54 |
| 2021/0290974 | A1* | 9/2021 | Emerson | A61N 5/0624 |

OTHER PUBLICATIONS

International Search Report corresponding to Application No. PCT/AT2020/060366, dated Jun. 22, 2021.

* cited by examiner

IRRADIATION DEVICE AND SYSTEM FOR PHOTODYNAMIC DISINFECTION OF TEETH AND GUMS

CROSS-REFERENCE TO RELATED APPLICATIONS

This application is a National Phase application of International Application No. PCT/AT2020/060366 filed Oct. 13, 2020 which is incorporated herein by reference.

TECHNICAL FIELD

The present subject matter relates to an irradiation device for photodynamic disinfection of teeth and gums in a mouth. The subject matter further relates to a system comprising such an irradiation device.

BACKGROUND

In the photodynamic disinfection of teeth and gums in the mouth, the interaction of light and a photosensitiser in the mouth destroys a harmful biofilm on the teeth and gums, usually formed by bacteria, and thus combats, for example, caries, gingivitis and/or periodontitis. The photosensitiser penetrates the bacteria or attaches itself to them and is activated by the irradiation. In the process, free radicals, for example reactive oxygen species ("ROS"), are generated. The free radicals are neither carcinogenic nor genotoxic for humans and act as a biocide, i.e. as a substance that destroys pathogens, for example fungi (including their spores), bacteria, parasites and viruses. Depending on the type of photosensitiser, it either acts as a catalyst in photodynamic disinfection, which, when exposed to radiation, generates the free radicals from the environment, for example from a solution containing the photosensitiser; or the photosensitiser itself releases free radicals when exposed to radiation. The wavelength of the radiation to be emitted by the radiation source must be matched to the photosensitiser used and its absorption spectrum; it generally ranges from the ultraviolet to the infrared range.

A device for whitening teeth is known from US 2015/0044628 A1, said device having a curved trough and a handle projecting therefrom. The trough is filled with a photoactivatable substance, for example a gel, and pressed over the dental arch of the upper or lower jaw like a dental impression tray. On its inner trough side walls, the trough has ultraviolet LEDs for irradiating the teeth. The disadvantage of this is on the one hand that the trough is perceived as extremely unpleasant in the mouth due to its size and the gel filling and often triggers a gag reflex, for example. Also, several troughs of different sizes and/or curvatures have to be provided for different dentitions. Furthermore, the ultraviolet radiation has a localised effect, so that a large number of LEDs are required, which hinders a reduction in the size of the trough and leads to increased waste heat in view of the decreasing efficiency of the LEDs with smaller wavelengths.

The use of infrared LEDs for photodynamic disinfection of a mouth is known from WO 2011/084744 A1. In order to counteract excessive heating by the infrared radiation, it is suggested to irradiate only parts of the mouth selectively.

BRIEF SUMMARY

The subject matter aims to provide an irradiation device and system which are simple, convenient and efficient to use.

According to a first aspect of the subject matter, this objective is achieved by an irradiation device for photodynamic disinfection of teeth and gums in a mouth, comprising a mouthpiece which can be inserted into the mouth, has a U-shape approximating the dental arch and is equipped with one or more radiation sources for radiation in a wavelength range between 500 nm and 1000 nm, a handle piece which projects from the mouthpiece in such a way that it protrudes from the mouth after insertion of the mouthpiece, and a controller for actuating the radiation sources, wherein the handle piece has a heat sink and the radiation sources are mounted on a heat-conducting substrate which connects the radiation sources to the heat sink heat-conductingly.

The subject matter is based on the knowledge that radiation in the wavelength range between 500 nm and 1000 nm is also transmitted in the tooth enamel and thereby radiated by it. On the one hand, this results in the radiation having a less localised effect than, for example, ultraviolet radiation, which allows a smaller design of the irradiation device, in particular its mouthpiece, and consequently a simple and efficient application with the same disinfection effect. On the other hand, in order to prevent an unpleasant sensation of heat in sensitive teeth as a result of the thermal effect accompanying the radiation, effective heat dissipation via the heat-conducting substrate is provided, making the irradiation particularly safe and comfortable.

In an advantageous embodiment, the substrate is a metal-core printed circuit board lying in a plane spanned by the U-shape. The metal-core printed circuit board fulfils two functions: it supports and contacts the components and dissipates the heat from the radiation sources. A separate heat-conducting substrate can thus be omitted, which allows a simple construction and a small overall size—especially of the mouthpiece.

In an optional variant of this embodiment, the radiation sources are mounted on at least one of the upper and lower sides of the metal-core printed circuit board and have radiation directions normal to said plane. The mouthpiece can thus be constructed in layers in a particularly flat and space-saving manner. Starting from the chewing surface of the molars or the cutting edge of the incisors, the radiation is guided and radiated through the enamel along each tooth into the gingival furrow between the tooth and the gum, resulting in uniform, extensive and deep disinfection. Furthermore, one and the same flat mouthpiece can be used for a variety of dentition variations.

The radiation sources can be any radiation sources or ends of waveguides fed with corresponding radiation. It is particularly advantageous if the radiation sources are infrared LEDs. These are efficient and available for different infrared wavelength ranges, making it easy to match them to the photosensitiser(s) used. Furthermore, infrared radiation additionally has a wound-healing and anti-inflammatory effect ("photobiological effect"). The infrared LEDs can be, for example, LEDs for water-filtered infrared A ("wIRA LEDs").

In an advantageous embodiment, the mouthpiece is coated with a coating that is transparent at least in the wavelength range of the radiation sources. This increases the service life and application safety of the mouthpiece and protects the teeth. Suitable coatings are durable, lightfast, saliva and abrasion resistant, free of harmful substances and at the same time easy to apply, for example to spray on. Examples of such coatings are known from medicine, especially dentistry.

It is particularly advantageous here if, above each radiation source, the coating is formed into a lens that refracts the radiation. This allows the radiation to be guided and a uniform irradiation of the entire mouth or teeth and gums to be achieved with only a few radiation sources.

It is advantageous if the controller is located in the handle piece. This facilitates handling, as no wired or wireless connection to the controller is required during use of the irradiation device. The irradiation device can thus be set up as an integrated unit in a space-saving manner.

It is particularly convenient for the user and effective in the application if the controller is designed to actuate the radiation sources to emit temporally changing radiation intensity.

A particularly efficient variant results if the mouthpiece has at least two radiation sources and the controller is designed to actuate the at least two radiation sources to emit radiation intensities that are different from each other.

In a favourable embodiment, the irradiation device has a groove running along the U-shape on the upper and lower side of the mouthpiece and a tooth protection plate which is removably inserted into the groove and which is transparent at least in the wavelength range of the radiation sources. This prevents direct biting on sensitive parts of the mouthpiece or its coating, which protects the device and makes its use even safer.

It is particularly advantageous if the tooth protection plate is made of silicone. Silicone is soft and therefore particularly comfortable to use. When biting down on the silicone tooth protection plate, the mouthpiece and with it the entire irradiation device have a consistently secure fit in the mouth; furthermore, the soft and transparent silicone improves the introduction of the radiation into the enamel, which increases the efficacy of the irradiation.

In order to provide the most even, anatomically favourable tooth plate possible, the tooth protection plate is optionally thicker in the middle of the U-shape than at the ends of the U-shape.

According to a second aspect, the subject matter provides a system for photodynamic disinfection of teeth and gums in a mouth, which is characterised by an irradiation device of the aforementioned type and a rinsing solution for rinsing the mouth in preparation for irradiation, which rinsing solution contains at least one photosensitiser. When the mouth is rinsed with the rinsing solution prior to irradiation, the photosensitiser infiltrates the bacteria of the biofilm and remains in the mouth during irradiation, without the need to keep all the rinsing solution used during rinsing in the mouth. With regard to further advantages and embodiments of the system, reference is made to the previous explanations relating to the irradiation device.

In addition to the photosensitiser, the rinsing solution can contain various additives that enhance the disinfection effect or achieve additional effects. In a particularly advantageous embodiment, the rinsing solution contains a nanoparticle carrier to which the photosensitiser is bound. It is particularly advantageous if the nanoparticle carrier is a graphene-based nanoparticle carrier or chitosan. Such nanoparticle carriers significantly improve the uptake of the photosensitiser in the biofilm, which leads to an enhancement of the disinfection effect. Furthermore, nanoparticle carriers improve the long-term effect of disinfection, prevent a decrease in bacterial sensitivity and reduce possible solubility problems with certain photosensitisers, thus broadening the choice of photosensitisers that can be used.

It is advantageous if the rinsing solution contains potassium iodide and/or urea. Potassium iodide and urea both enhance the antimicrobial photodynamic effect of the rinsing solution. It is also advantageous if the rinsing solution contains L-arginine. This amino acid acts as a biofilm disruptor and thus also enhances the effect of the photosensitiser on the biofilm. It is particularly beneficial if the rinsing solution contains xylitol. Xylitol blocks the metabolism of the biofilm and thus additionally prevents the formation of new biofilm. It is also favourable if the rinsing solution contains a nuclease, for example an RNase or DNase. Such a nuclease supports the degradation of bacteria in the biofilm that have been compromised by the photodynamic effect.

BRIEF DESCRIPTION OF THE DRAWINGS

The subject matter is explained in greater detail below with reference to an exemplary embodiment shown in the accompanying drawings, in which.

DETAILED DESCRIPTION

Figure 1:
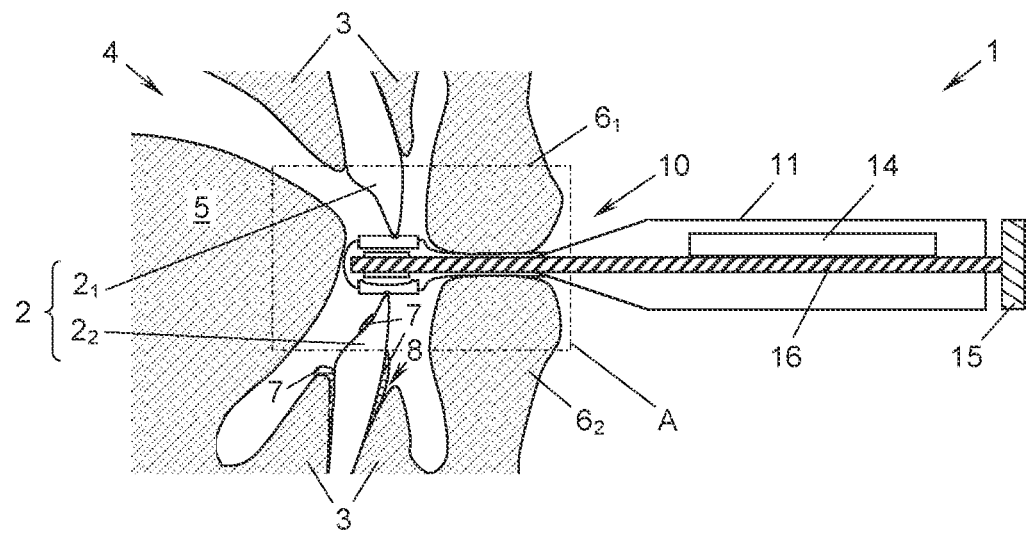
FIG. 1 shows a vertical longitudinal section of an irradiation device according to the subject matter in its position inserted in a mouth.

FIG. 1 shows an irradiation device 1 for photodynamic disinfection of teeth 2 (here: upper and lower incisors $2_1$, $2_2$) and gums 3 in a mouth 4, which is shown partially with a tongue 5 and an upper and a lower lip $6_1$, $6_2$. A substantially bacterial biofilm 7 has formed on the lower incisor $2_2$. Biofilm 7 has also been deposited on the gum 3 surrounding the lower incisor $2_2$ and in a gum furrow 8 between the lower incisor $2_2$ and the gum 3. Such biofilm 7 is harmful to teeth $2_1$, $2_2$ and gums 3 as it causes, among other things, caries, gingivitis and/or periodontitis. In comparison, the upper incisor $2_1$ and the surrounding gums 3 are free of biofilm 7. The harmful biofilm 7 is to be destroyed by photodynamic disinfection, as described below.

In photodynamic disinfection, a photosensitiser is introduced into the mouth 4. Subsequent irradiation activates the photosensitiser, wherein the photosensitiser generates free radicals, for example reactive oxygen species ("ROS"), which as biocide destroy the biofilm 7 and thereby disinfect the teeth 2 and gums 3. Most photosensitisers act as a catalyst that generates the free radicals from the environment upon irradiation; other photosensitisers release free radicals themselves upon irradiation.

In the present case, depending on the requirements, the photosensitiser 9 (FIG. 2) is for example indocyanine green, methylene blue, toluidine blue, rose bengal, erythrosine, acridine orange and/or tetracycline, which is additionally antibiotically active. The photosensitiser 9 is contained in a rinsing solution with which the user rinses their mouth 4 for a few seconds (for example about 30 seconds) in preparation for the following irradiation. Thus, the irradiation device 1 and the rinsing solution with photosensitiser 9 contained therein act together as a system. It is understood that more than one photosensitiser 9 may also be contained in the rinsing solution.

The rinsing solution is for example water-based with optionally a small amount (for example between 0.5 and 1.5 wt. %, in particular 0.9 wt. %) of common salt dissolved therein. During rinsing, the photosensitiser 9 attaches to the biofilm 7 and/or infiltrates the bacteria of the biofilm 7. Optionally, the rinsing solution contains a nanoparticle carrier, for example a graphene-based nanoparticle carrier, chitosan, etc., to which the photosensitiser is bound and which is well absorbed by the cells of the biofilm 7.

The rinsing solution may further optionally contain bactericides and/or oxygenators, etc. In particular, the rinsing solution optionally contains potassium iodide, urea, tin fluoride and/or amine fluoride to enhance the antimicrobial effect, L-arginine and/or methyl salicylate as a biofilm disruptor, xylitol to block the metabolism of the biofilm, a nuclease (for example an RNase or DNase) for improved degradation of bacteria in the biofilm compromised by the photodynamic effect, zinc chloride for easier removal of hard deposits, especially on the teeth 2, sodium fluoride for strengthening the enamel and/or flavonoids or catechins with antioxidant effect.

According to FIG. 1, the irradiation device 1 comprises a mouthpiece 10, which is inserted into the mouth 4, and a handle piece 11 projecting from the mouthpiece 10, which handle piece 11 protrudes from the mouth 4 in the position of the mouthpiece 10 inserted into the mouth 4. The mouthpiece 10 is equipped with one or more radiation sources 12 for radiation 13 in a wavelength range between 500 nm and 1000 nm, i.e. the emitted radiation 13 lies in a certain wavelength range, depending on the selected type of radiation source 13, and has a distinct intensity maximum between 500 nm and 1000 nm. The radiation sources 12 serve to irradiate the biofilm 7 infiltrated with photosensitiser 9 or the biofilm 7 with adsorbed photosensitiser 9 and thereby, in addition to the photodynamic effect, contribute— to a greater or lesser extent depending on the wavelength— to the photobiological effect, i.e. to wound healing and inflammation inhibition at the gums 3, and thus to the prevention of periodontitis. The irradiation device 1 also has a controller 14, which actuates the radiation sources 12 and which, in the example shown, is arranged in the handle piece 11, but which could alternatively be separate therefrom and, for example, connected to the radiation sources 12 via a cable or arranged generally in the mouthpiece 10.

The handle piece 11 has a heat sink 15. In the embodiment of FIG. 1, the heat sink 15 is a cooling fin at the end of the handle piece 11 furthest from the mouthpiece 10. In other embodiments, the heat sink 15 may, for example, have a set of cooling fins or be part of the housing surface of the handle piece 11 and may thus be cooled passively, i.e. by convection. Alternatively, the heat sink can be actively cooled, for example with a fan or a Peltier element.

The radiation sources 12 are mounted on a heat-conducting substrate 16. The heat-conducting substrate 16 connects the radiation sources 12 of the mouthpiece 10 to the heat sink 15 of the handle piece 11 heat-conductingly and thus extends from the mouthpiece 10 into the handle piece 11.

Figure 3:
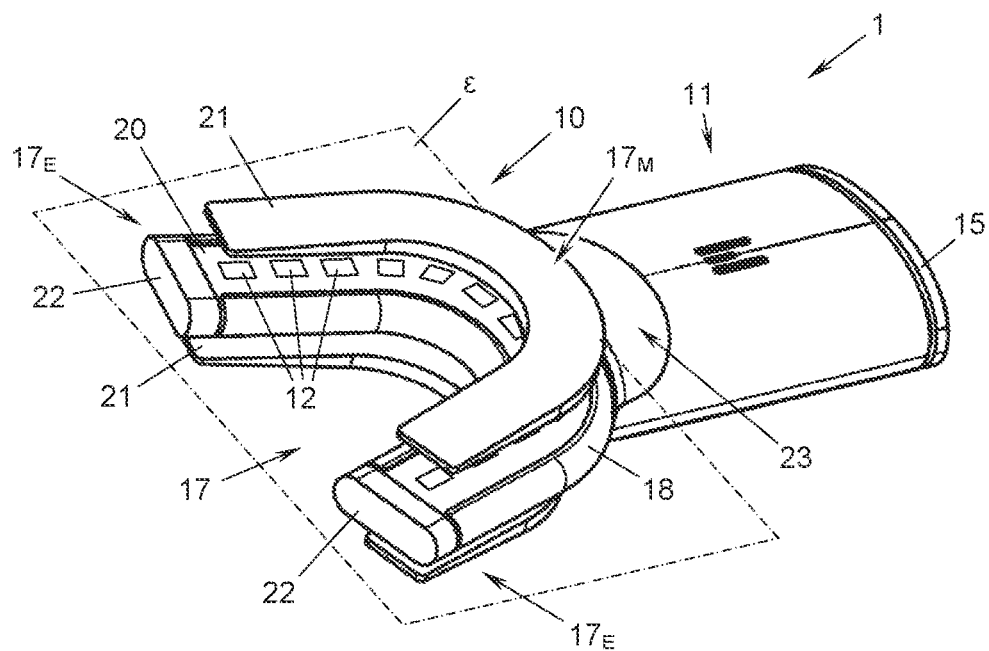
FIG. 3 shows the irradiation device from FIG. 1 in a perspective view obliquely from above.
Figure 4:
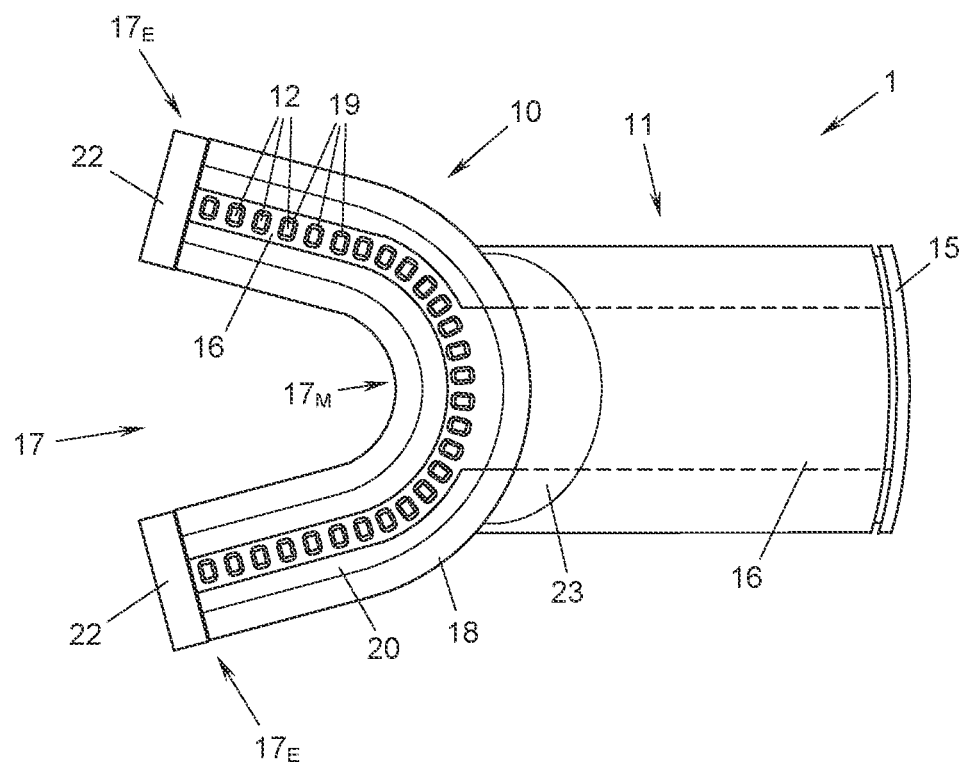
FIG. 4 shows the irradiation device from FIG. 1 in plan view.

As shown in FIG. 3, the mouthpiece 10 has a U-shape 17 which approximates the dental arch, for example an average dental arch. The U-shape 17 spans a plane ε which, in the position of the mouthpiece 10 inserted into the mouth 4, lies between the teeth $2_1$ of the upper jaw on the one hand and the teeth $2_2$ of the lower jaw on the other hand.

In the example shown, the heat-conducting substrate 16 is a metal-core printed circuit board lying in the plane ε, for example with an aluminium or copper core. It is understood that the substrate 16 need not be flat throughout, but may for example have one or more bends, for example at the transition from the mouthpiece 10 to the handle piece 11 and/or in the handle piece 11. Alternatively, the substrate 16 could have any shape or could also be a heat pipe.

Figure 2:
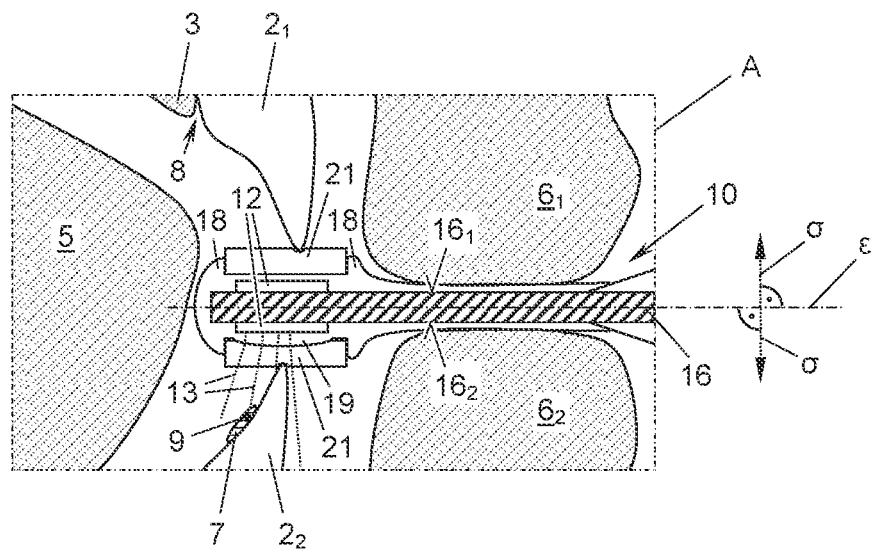
FIG. 2 shows the detail A from FIG. 1.

As shown in FIG. 2, the radiation sources (for example LEDs, here: infrared LEDs, for example LEDs for water-filtered infrared A, "wIRA LEDs") 12 are optionally mounted on both the upper side $16_1$ and the lower side $16_2$ of the metal-core printed circuit board and each have radiation directions σ approximately normal to said plane ε. In the present context, a radiation direction σ normal to the plane ε denotes a radiation 13 which is emitted by a radiation source 12 under the usual divergence of the latter and which, on average, is directed normal to the plane ε. Different numbers of radiation sources 12 may be mounted on the upper and lower sides $16_1$, $16_2$ respectively. Alternatively, the one or more radiation sources 12 could be mounted only on the upper side $16_1$ or only on the lower side $16_2$. Instead of (infrared) LEDs, the radiation sources 12 may be of another type, for example conventional (infrared) lamps. Furthermore, ends of waveguides fed with the radiation 13 can form the radiation sources 12.

Each radiation source 12 optionally has a power density here between 0.5 J/cm$^2$ and 1000 J/cm$^2$. The wavelength of the radiation 13 emitted by each radiation source 12 is in the range of about 500 to 1000 nm, e.g. in the red light or near infrared range ("NIR") between 610 and 850 nm, and is matched to the photosensitiser 9, i.e. to its absorption wavelength, or, conversely, the photosensitiser 9 is selected depending on the wavelength of the radiation 13 emitted by the radiation source 12; for example, indocyanine green becomes active when irradiated below a wavelength of about 810 nm, methylene blue at about 650 nm, toluidine blue at about 630 nm, rose bengal at about 562 nm, erythrosine at about 530 nm, acridine orange at about 502 nm, and so on.

In the example shown in FIGS. 1 to 4, the mouthpiece 10 is optionally covered, i.e. completely covered, by a coating 18 which protects the sensitive parts of the mouthpiece 10 from saliva and aggressive substances as well as from mechanical wear. Conversely, the coating 18 protects teeth 2, tongue 5 and lips $6_1$, $6_2$ from damage or injury by, for example, sharp-edged parts of the mouthpiece 10. The coating 18 is transparent at least in the wavelength range of the intensity maximum of the radiation 13 emitted by the radiation sources 12, i.e. in the wavelength range of the radiation sources 12, and is sprayed onto the mouthpiece 10 or cast therewith, for example. Coatings 18 of this type are known to the person skilled in the art in the field of medicine, in particular dentistry.

Optionally, the coating 18 above each radiation source 12, i.e. in the radiation direction σ of each radiation source 12, is formed into a lens 19 refracting the radiation 13. The lens 19 is convexly or concavely curved as required to distribute the radiation 13—for example evenly—over the teeth 2 and gums 3 in the mouth 4 according to a predetermined pattern. Alternatively, the lens 19 could be formed by other means, i.e. not by the coating 18 itself, or could be omitted altogether.

The controller 14 is optionally designed to actuate the radiation sources 12 to emit temporally changing, for example pulsating or rising and falling, radiation intensity. The temporally changing radiation intensity follows a predefined cycle and allows high peak intensity with simultaneously lower average heat development in the mouth 4. In total, the irradiation lasts between 100 ms and 60 minutes, for example about 2 to 5 minutes.

Additionally or alternatively, if the mouthpiece 10 has at least two radiation sources 12, the controller 14 can optionally actuate the radiation sources 12 to emit radiation intensities that are different from each other. In the example of FIG. 1, for example, the controller 14 could actuate the radiation source 12 directed at the lower incisor $2_2$ to emit a high radiation intensity, since harmful biofilm 7 has formed on and around the lower incisor $2_2$, whereas the controller 14 actuates the radiation source 12 directed at the upper incisor $2_1$, which is free of biofilm 7, to emit a low radiation intensity (here: for example no radiation 13 at all).

In the example of FIG. 3, the mouthpiece 10 has a groove on its upper and lower side, which runs along the U-shape 17 of the mouthpiece 10. A tooth protection plate 21 can be inserted into the groove 20. The tooth protection plate 21 is transparent at least in the wavelength range of the radiation sources 12 and optionally exchangeable, i.e. it can be removed again after insertion into the groove 20. The tooth protection plate 21 serves to protect the teeth 2 or the mouthpiece 10 if, for example, the patients bites on the mouthpiece 10 during irradiation. For this purpose, the tooth protection plate 21 is optionally soft, for example made of silicone.

In order to give the mouthpiece 10 an anatomically suitable shape, the mouthpiece 10 itself and/or the tooth protection plate 21 is optionally thicker in the middle $17_M$ of the U-shape 17 than at the ends $17_E$ of the U-shape 17. The ends $17_E$ of the U-shape 17 are closed with optional caps 22 in the example of FIG. 3. Furthermore, for better closing of the mouth 4 when the mouthpiece 10 is inserted, the handle piece 11 has optional recesses 23 on the upper and/or lower side, adjacently to the mouthpiece 10.

The subject matter is not limited to the embodiment presented, but encompasses all variants, modifications and combinations thereof which fall within the scope of the appended claims.

What is claimed is:

1. An irradiation device for photodynamic disinfection of teeth and gums in a mouth, comprising
   a mouthpiece which can be inserted into the mouth, has a U-shape approximating a dental arch and, wherein the U-shaped mouthpiece includes a plurality of radiation sources positioned thereon for radiation in a wavelength range between 500 nm and 1000 nm,
   a handle piece which projects from the mouthpiece in such a way that the handle piece protrudes from the mouth after insertion of the mouthpiece, and
   a controller for actuating the plurality of radiation sources, wherein the handle piece has a heat sink and the plurality of radiation sources are mounted on a heat-conducting substrate which connects the plurality of radiation sources of the mouthpiece to the heat sink in a heat-conducting manner, wherein the mouthpiece is covered by a coating which is transparent in the wavelength range of the plurality of radiation sources, and wherein the coating is formed into a plurality of lenses such that each lens is respectively positioned above and refracts the radiation of one of the plurality of radiation sources.

2. The irradiation device according to claim 1, wherein the substrate is a metal-core printed circuit board lying in a plane spanned by the U-shape.

3. The irradiation device according to claim 2, wherein the metal-core printed circuit board has an upper and a lower side and the plurality of radiation sources are mounted on at least one of said upper and lower sides and have radiation directions normal to said plane.

4. The irradiation device according to claim 1, wherein the plurality of radiation sources are infrared LEDs.

5. The irradiation device according to claim 1, wherein the controller is arranged in the handle piece.

6. The irradiation device according to claim 1, wherein the controller is designed to actuate the plurality of radiation sources to emit radiation of a temporally changing radiation intensity.

7. The irradiation device according to claim 1, wherein the controller is designed to actuate at least two radiation sources of the plurality of radiation sources to emit radiation intensities that are different from each other.

8. The irradiation device according to claim 1, further comprising a groove running along the U-shape on upper and lower sides of the mouthpiece and a tooth protection plate which is removably inserted into the groove and which is transparent in the wavelength range of the plurality of radiation sources.

9. The irradiation device according to claim 8, wherein the tooth protection plate is made of silicone.

10. A system for photodynamic disinfection of teeth and gums in a mouth, comprising an irradiation device according to claim 1 and a rinsing solution for rinsing the mouth in preparation for irradiation, which rinsing solution contains at least one photosensitiser.

11. The system according to claim 10, wherein the rinsing solution contains a nanoparticle carrier to which the at least one photosensitiser is bound.

12. The system according to claim 11, wherein the nanoparticle carrier is a graphene-based nanoparticle carrier or chitosan.

13. The system according to claim 10, wherein the rinsing solution contains potassium iodide or urea or both potassium iodide and urea.

14. The system according to claim 10, wherein the rinsing solution contains L-arginine.

15. The system according to claim 10, wherein the rinsing solution contains xylitol.

16. The system according to claim 10, wherein the rinsing solution contains a nuclease.

17. An irradiation device for photodynamic disinfection of teeth and gums in a mouth, comprising
   a mouthpiece which can be inserted into the mouth, has a U-shape approximating a dental arch and includes one or more radiation sources for radiation in a wavelength range between 500 nm and 1000 nm,
   a handle piece which projects from the mouthpiece in such a way that the handle piece protrudes from the mouth after insertion of the mouthpiece, and
   a controller for actuating the one or more radiation sources,
   wherein the handle piece has a heat sink and the one or more radiation sources are mounted on a heat-conducting substrate which connects the one or more radiation sources to the heat sink in a heat-conducting manner,
   further comprising a groove running along the U-shape on upper and lower sides of the mouthpiece and a tooth protection plate which is removably inserted into the groove and which is transparent in the wavelength range of the one or more radiation sources, wherein the tooth protection plate is thicker in a middle portion of the U-shape than at end portions of the U-shape.

18. A system for photodynamic disinfection of teeth and gums in a mouth, comprising an irradiation device according to claim 17 and a rinsing solution for rinsing the mouth in preparation for irradiation, which rinsing solution contains at least one photosensitiser.

19. An irradiation device for photodynamic disinfection of teeth and gums in a mouth comprising:
   a mouthpiece adapted to be inserted into the mouth, the mouthpiece including at least one radiation source for emitting radiation in a wavelength range from about 500 nm to about 1000 nm;

a handle portion extending from the mouthpiece such that the handle portion protrudes from the mouth after insertion of the mouthpiece;

a controller adapted to actuate the at least one radiation source;

wherein the at least one radiation source is mounted on a heat-conducting substrate which extends into the handle portion and is coupled to a heat sink whereby heat generated by the at least one radiation source is thermally coupled to the heat sink, further comprising a groove running along the U-shape on upper and lower sides of the mouthpiece and a tooth protection plate which is removably inserted into the groove and which is transparent in the wavelength range of the at least one radiation source, wherein the tooth protection plate is thicker in a middle portion of the U-shape than at end portions of the U-shape.

20. A system for photodynamic disinfection of teeth and gums in a mouth, comprising an irradiation device according to claim 19 and a rinsing solution for rinsing the mouth in preparation for irradiation, which rinsing solution contains at least one photosensitiser.

* * * * *